United States Patent
Kim et al.

(10) Patent No.: US 8,750,154 B2
(45) Date of Patent: Jun. 10, 2014

(54) METHOD AND APPARATUS FOR SUPPORTING DISCONTINUOUS RECEPTION OPERATION IN MOBILE COMMUNICATION SYSTEM

(75) Inventors: Sang-Bum Kim, Seoul (KR); Sung-Ho Choi, Suwon-si (KR); Soeng-Hun Kim, Suwon-si (KR); Kyeong-In Jeong, Hwaseong-si (KR); Jung-Soo Jung, Seongnam-si (KR); Chae-Gwon Lim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 149 days.

(21) Appl. No.: 13/521,304

(22) PCT Filed: Jan. 4, 2011

(86) PCT No.: PCT/KR2011/000023
§ 371 (c)(1),
(2), (4) Date: Jul. 10, 2012

(87) PCT Pub. No.: WO2011/087233
PCT Pub. Date: Jul. 21, 2011

(65) Prior Publication Data
US 2012/0300685 A1    Nov. 29, 2012

(30) Foreign Application Priority Data

Jan. 12, 2010   (KR) .................. 10-2010-0002601
Apr. 5, 2010    (KR) .................. 10-2010-0031140
May 7, 2010     (KR) .................. 10-2010-0043234

(51) Int. Cl.
*G08C 17/00*    (2006.01)
*H04W 68/00*    (2009.01)
*H04W 76/04*    (2009.01)
*H04W 68/02*    (2009.01)

(52) U.S. Cl.
CPC ............ *H04W 76/048* (2013.01); *H04W 68/02* (2013.01)
USPC ........................... 370/252; 370/311; 455/458

(58) Field of Classification Search
CPC ............ H04W 72/04; H04W 72/0406; H04W 72/042; H04W 68/00; H04W 68/02; H04W 68/025; H04W 76/048
USPC ........... 370/252, 311, 328, 329; 455/450, 458
See application file for complete search history.

(56) References Cited

U.S. PATENT DOCUMENTS

| | | |
|---|---|---|
| 2002/0006805 A1 | 1/2002 | New et al. |
| 2004/0023672 A1 | 2/2004 | Terry |
| 2004/0029596 A1 | 2/2004 | Kim et al. |
| 2005/0249140 A1 | 11/2005 | Lee et al. |
| 2009/0203376 A1* | 8/2009 | Sambhwani et al. ......... 455/434 |
| 2010/0214968 A1* | 8/2010 | Paliwal et al. ................ 370/311 |
| 2010/0272004 A1* | 10/2010 | Maeda et al. ................. 370/312 |

OTHER PUBLICATIONS

R2-100331, Introduction of longer SFN length for MTC, 3GPP TSG RAN WG2 #68bis, Valencia, Spain, Jan. 18-22.

* cited by examiner

*Primary Examiner* — Kerri Rose
(74) *Attorney, Agent, or Firm* — Jefferson IP Law, LLP

(57) ABSTRACT

A method and an apparatus for supporting a discontinuous reception (DRX) operation in a Node B in a mobile communication system are provided. The method includes defining a second System Frame Number (SFN) where one cycle of a first SFN corresponds to one bit, transmitting information on the second SFN to a User Equipment (UE), determining a second SFN which is used to transmit a paging signal to the UE, determining a first SFN which is used to transmit the paging signal in the determined second SFN, and transmitting the paging signal to the UE at the determined first SFN.

28 Claims, 10 Drawing Sheets

METHOD AND APPARATUS FOR SUPPORTING DISCONTINUOUS RECEPTION OPERATION IN MOBILE COMMUNICATION SYSTEM

PRIORITY

This application is a National Stage application under 35 U.S.C. §371 of an International application filed on Jan. 4, 2011 and assigned application No. PCT/KR2011/000023, and claims the benefit under 35 U.S.C. §365(b) of a Korean patent application filed in the Korean Industrial Property Office on Jan. 12, 2010 and assigned Ser. No. 10-2010-0002601, a Korean patent application filed in the Korean Industrial Property Office on Apr. 5, 2010 and assigned Ser. No. 10-2010-0031140, and a Korean patent application filed in the Korean Industrial Property Office on May 7, 2010 and assigned Ser. No. 10-2010-0043234, the entire disclosure of each of which is hereby incorporated by reference.

BACKGROUND OF THE INVENTION

1. Field of the Invention

The present invention relates to a mobile communication system. More particularly, the present invention relates to a method and apparatus for supporting a Discontinuous Reception (DRX) operation in a mobile communication system.

2. Description of the Related Art

In general, mobile communication systems have been developed with an aim to provide communication while guaranteeing mobility of users thereof. With the rapid progress of technologies, such mobile communication systems have been developed to provide not only voice communication services but also high-speed data communication services. Now, the next-generation mobile communication system is being conducted to provide Human-to-Machine (H2M) communication and Machine-to-Machine (M2M) communication, beyond Human-to-Human (H2H) communication. In order to meet such a requirement, the 3rd Generation Partnership Project (3GPP), which is responsible for the standardization of communication, is working on a standard for machine-type communication. 3GPP SA1 Working Group (WG), which is responsible for defining services and characteristics thereof, is already discussing service requirements for machine-type communication.

FIG. 1 is a block diagram illustrating a communication scenario for machine-type communication according to the related art.

Referring to FIG. 1, machine-type communication devices 105 are connected with a wireless provider network 110. Generally, the machine-type communication devices 105 may be defined as various unattended devices, including as meters, automatic vending machines, and the like. The machine-type communication devices 105 may have characteristics different from those of the existing wireless User Equipments (UEs) in several respects. Also, the machine-type communication devices 105 may have different characteristics depending on the types thereof. One cell may include numerous machine-type communication devices 105. A machine-type communication server 115, which has information on the machine-type communication devices 105, functions not only to perform authentication, but also to gather and deliver information, which is collected from the machine-type communication devices 105. The machine-type communication server 115 delivers the information to a machine-type communication user 120. The machine-type communication server 115 may exist inside or outside of the wireless provider network 110. In addition, the machine-type communication user 120 is a final user who needs information delivered from the machine-type communication devices 105.

The machine-type communication has characteristics different from those of the existing wireless communication. Also, the characteristics of the machine-type communication are classified in various ways depending on the use purposes. For example, machine-type communication devices requiring communication only a few times a day regardless of time have a time-tolerant characteristic; and machine-type communication devices, which are installed at fixed positions without mobility and are configured to collect and transmit specific information, have a low mobility characteristic. Wireless providers have to provide services by taking characteristics of such various machine-type communications and the coexistence of machine-type communication devices and the existing UEs into consideration.

Of machine-type communication devices, tracking-related devices, such as devices equipped on animals or trucks, generally either use batteries, or are supplied with power generated by themselves. Therefore, because such machine-type communication devices can use only limited power, the machine-type communication services must be configured to efficiently use extremely small power. The 3GPP SA1 WG defines an extra low power consumption mode, in which machine-type communication devices may be set to use low power.

In the extra low power consumption mode, operations capable of reducing the use of power can be performed, wherein one of such operations is a method of lengthening a Discontinuous Reception (DRX) cycle. A UE performs a reception operation in order to receive a paging signal from an evolved Node B (eNB). However, a paging signal is not a frequently transmitted signal. Consequently, if the UE performs a reception operation even while the eNB does not transmit a paging signal, power loss becomes large. Therefore, in order to reduce power consumption, it is possible to periodically perform a reception operation only during specific time intervals so as to attempt to receive a paging signal, which is called a Discontinuous Reception (DRX). In a Long Term Evolution (LTE) system, the DRX operations of UEs being in an idle state are achieved by Equation 1 below. A System Frame Number (SFN) increases by one every radio frame. In a radio frame satisfying Equation 1 below, a paging signal is delivered, and a UE performs a reception operation based on DRX.

$$SFN \bmod T = (T \text{ div } N) * (U\_ID \bmod N) \qquad (1)$$

In Equation 1, "SFN" has 10 bits (i.e., MSB 8 bits explicit, and LBS 2 bits implicit), and "T" denotes a DRX cycle of a UE. The "T" is a value, which is included in a System Information Block Type 2 (SIB2) and is provided from an eNB, and may be, for example, rf32, rf64, rf128, or rf256. Also, "N" is "min (T, nB)," wherein "nB" is a value which is included in the SIB2 and is provided from the eNB, and may be, for example, 4T, 2T, T, T/2, T/4, T/8, T/16, or T/32. In addition, "UE_ID" is International Mobile Station Identity (IMSI) mod 1024, and 8 bits of a Master Information Block (MIB) of a Physical Broadcast CHannel (PBCH) represent an SFN.

FIG. 2 is a view showing a conception of a paging occasion in a conventional LTE technology according to the related art.

Referring to FIG. 2, an SFN increases by one every radio frame (see reference numeral 205). The SFN has a cycle of 1024, and is set to zero (see reference numeral 210). In addition, based on equation 1, a paging signal having the same pattern is repeated every SFN cycle (see reference numeral 215).

Most UEs corresponding to machine-type communication devices are expected to less frequently receive a paging signal than general UEs. For example, tracking-related devices will communicate with an eNB only a few times a day. Therefore, when a DRX cycle is set to be very long, it is possible to remarkably reduce power consumption due to reception operations. However, due to the characteristics of the 3GPP LTE system, the DRX cycle is limited by the length of an SFN. When the length of an SFN is 1024, the DRX cycle cannot exceed 1024. Accordingly, it is necessary to develop a method for first extending the length of an SFN in order to extend a DRX cycle, and a method for allowing an SFN extended for machine-type communication not to exert an influence on the paging operations of the existing UEs.

Therefore, a need exists for a method and apparatus for a Discontinuous Reception (DRX) operation in a mobile communication system. A need also exists for a method and apparatus for implementing a long SFN to extend the DRX cycle of a machine-type communication device in a mobile communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for a Discontinuous Reception (DRX) operation in a mobile communication system.

Another aspect of the present invention is to provide a method and apparatus for implementing a long System Frame Number (SFN) to extend the DRX cycle of a machine-type communication device in a mobile communication system.

Another aspect of the present invention is to provide a DRX operation method and apparatus for Machine-Type Communication (MTC), which is compatible with the existing DRX, in a mobile communication system.

In accordance with an aspect of the present invention, a method for supporting a Discontinuous Reception (DRX) operation in a Node B in a mobile communication system is provided. The method includes defining a second System Frame Number (SFN) where one cycle of a first SFN corresponds to one bit, transmitting information on the second SFN to a User Equipment (UE), determining a second SFN which is used to transmit a paging signal to the UE, determining a first SFN which is used to transmit the paging signal in the determined second SFN, and transmitting the paging signal to the UE at the determined first SFN.

In accordance with another aspect of the present invention, an apparatus for supporting a Discontinuous Reception (DRX) operation in a Node B in a mobile communication system is provided. The apparatus includes a transceiver for defining a second System Frame Number (SFN) where one cycle of a first SFN corresponds to one bit, and for transmitting information on the second SFN to a User Equipment (UE), and a controller for determining a second SFN which is used to transmit a paging signal to the UE, for determining a first SFN which is used to transmit the paging signal in the determined second SFN, and for controlling the transceiver to transmit the paging signal to the UE at the determined first SFN.

In accordance with still another aspect of the present invention, a method for supporting a Discontinuous Reception (DRX) operation in a User Equipment (UE) in a mobile communication system is provided. The method includes receiving, from a Node B, information on a second System Frame Number (SFN), where one cycle of a first SFN corresponds to one bit, monitoring the first SFN and the second SFN every cycle of the first SFN, determining whether the second SFN includes a paging signal, and determining whether the first SFN corresponding to the second SFN includes the paging signal when the second SFN includes the paging signal, and identifying the paging signal through the first SFN when the first SFN includes the paging signal.

In accordance with still another aspect of the present invention, an apparatus for supporting a Discontinuous Reception (DRX) operation in a User Equipment (UE) in a mobile communication system is provided. The apparatus includes a transceiver for receiving, from a Node B, information on a second System Frame Number (SFN), where one cycle of a first SFN corresponds to one bit, and a controller for monitoring the first SFN and the second SFN every cycle of the first SFN, determining whether the second SFN includes a paging signal, determining whether the first SFN corresponding to the second SFN includes the paging signal when the second SFN includes the paging signal, and for identifying the paging signal through the first SFN when the first SFN includes the paging signal.

In accordance with still another aspect of the present invention, a method for supporting a Discontinuous Reception (DRX) operation in a User Equipment (UE) in a mobile communication system is provided. The method includes receiving system information which includes a cell-specific DRX cycle from a Node B, transmitting an attach request message, which includes a UE-specific DRX cycle and an indication for selecting a DRX cycle of a long cycle, to a Mobility Management Entity (MME), selecting a longer cycle of the cell-specific DRX cycle and the UE-specific DRX cycle when receiving an attach response message from the MME, and receiving a paging message from the Node B in the selected DRX cycle.

In accordance with still another aspect of the present invention, an apparatus for supporting a Discontinuous Reception (DRX) operation in a User Equipment (UE) in a mobile communication system is provided. The apparatus includes a transceiver for receiving system information which includes a cell-specific DRX cycle from a Node B, and for transmitting an attach request message to a Mobility Management Entity (MME), the attach request message including a UE-specific DRX cycle and an indication for selecting a DRX cycle of a long cycle, and a controller for selecting a longer cycle of the cell-specific DRX cycle and the UE-specific DRX cycle when receiving an attach response message from the MME, and controlling the transceiver to receive a paging message from the Node B in the selected DRX cycle.

In accordance with still another aspect of the present invention, a method for supporting a Discontinuous Reception (DRX) operation in a Node B in a mobile communication system is provided. The method includes transmitting system information which includes a cell-specific DRX cycle to a User Equipment (UE), receiving a UE-specific DRX cycle and an indication for selecting a DRX cycle of a long cycle from a Mobility Management Entity (MME), selecting a longer cycle of the cell-specific DRX cycle and the UE-specific DRX cycle, and transmitting a paging message to the UE in the selected DRX cycle.

In accordance with still another aspect of the present invention, an apparatus for supporting a Discontinuous Reception (DRX) operation in a Node B in a mobile communication system is provided. The apparatus includes a transceiver for transmitting system information which includes a cell-specific DRX cycle to a User Equipment (UE), and for receiving a UE-specific DRX cycle and an indication for selecting a DRX cycle of a long cycle from a Mobility Management Entity (MME); and a controller for selecting a longer cycle of the cell-specific DRX cycle and the UE-specific DRX cycle, and for controlling the transceiver to transmit a paging message to the UE in the selected DRX cycle.

In accordance with still another aspect of the present invention, a method for supporting a Discontinuous Reception (DRX) operation in a User Equipment (UE) in a mobile communication system is provided. The method includes determining whether a cell on which the UE is currently camping corresponds to a cell supporting a DRX cycle of a long cycle, selecting a longer DRX cycle of a cell-specific DRX cycle and a UE-specific DRX cycle when the cell on which the UE is currently camping supports the DRX cycle of a long cycle, and receiving a paging message from a Node B of the cell, on which the UE is camping, in the selected DRX cycle.

In accordance with still another aspect of the present invention, an apparatus for supporting a Discontinuous Reception (DRX) operation in a User Equipment (UE) in a mobile communication system is provided. The apparatus includes a controller for determining whether a cell on which the UE is currently camping corresponds to a cell supporting a DRX cycle of a long cycle, and for selecting a longer DRX cycle of a cell-specific DRX cycle and a UE-specific DRX cycle when the cell on which the UE is currently camping supports the DRX cycle of a long cycle, and a transceiver for receiving a paging message from a Node B of the cell, on which the UE is camping, in the selected DRX cycle.

In accordance with still another aspect of the present invention, a method for supporting a Discontinuous Reception (DRX) operation in a Mobility Management Entity (MME) in a mobile communication system is provided. The method includes receiving a request for a DRX cycle of a long cycle from a User Equipment (UE), determining whether a cell on which the UE is camping supports a DRX cycle of a long cycle, and transmitting a paging message to a Node B of the cell, on which the UE is camping, in a UE-specific DRX cycle when the cell on which the UE is camping supports a DRX cycle of a long cycle.

In accordance with still another aspect of the present invention, an apparatus for supporting a Discontinuous Reception (DRX) operation in a Mobility Management Entity (MME) in a mobile communication system is provided. The apparatus includes a transceiver for receiving a request for a DRX cycle of a long cycle from a User Equipment (UE), and a controller for determining whether a cell on which the UE is camping supports a DRX cycle of a long cycle, and for controlling the transceiver to transmit a paging message to a Node B of the cell, on which the UE is camping, in a UE-specific DRX cycle when the cell on which the UE is camping supports a DRX cycle of a long cycle.

According to the embodiments of the present invention, the DRX cycle of a machine-type communication device is lengthened in a mobile communication system, so that it is possible to reduce the power consumption due to reception operations.

Also, according to the embodiments of the present invention, the length of an SFN is first extended in order to lengthen a DRX cycle in a mobile communication system, thereby exerting no influence on the paging operations of the existing UEs.

Meanwhile, the other various effects have been disclosed directly or suggestively in the above description according to the embodiments of the present invention.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
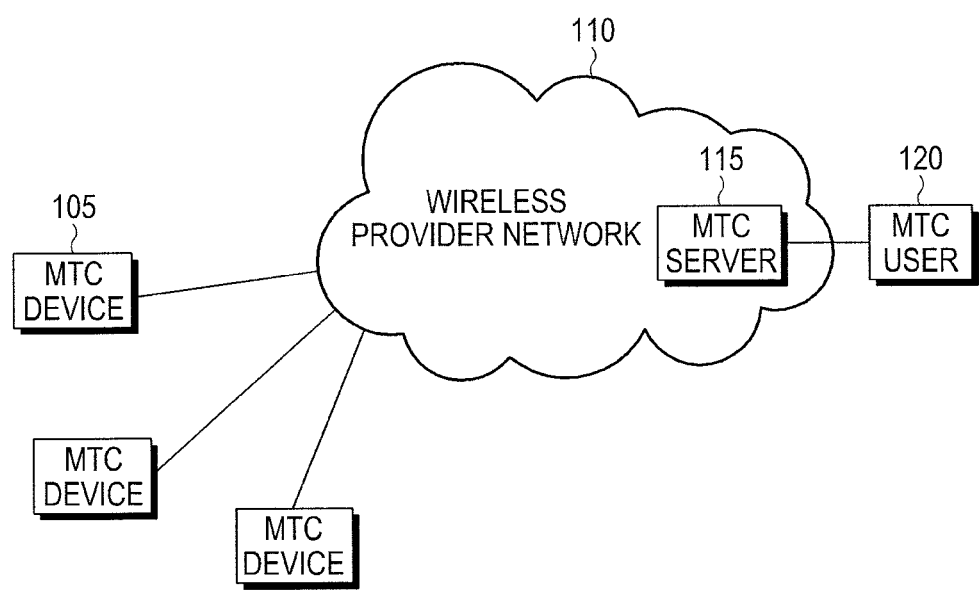
FIG. 1 is a block diagram illustrating a communication scenario for machine-type communication according to the related art.
Figure 2:
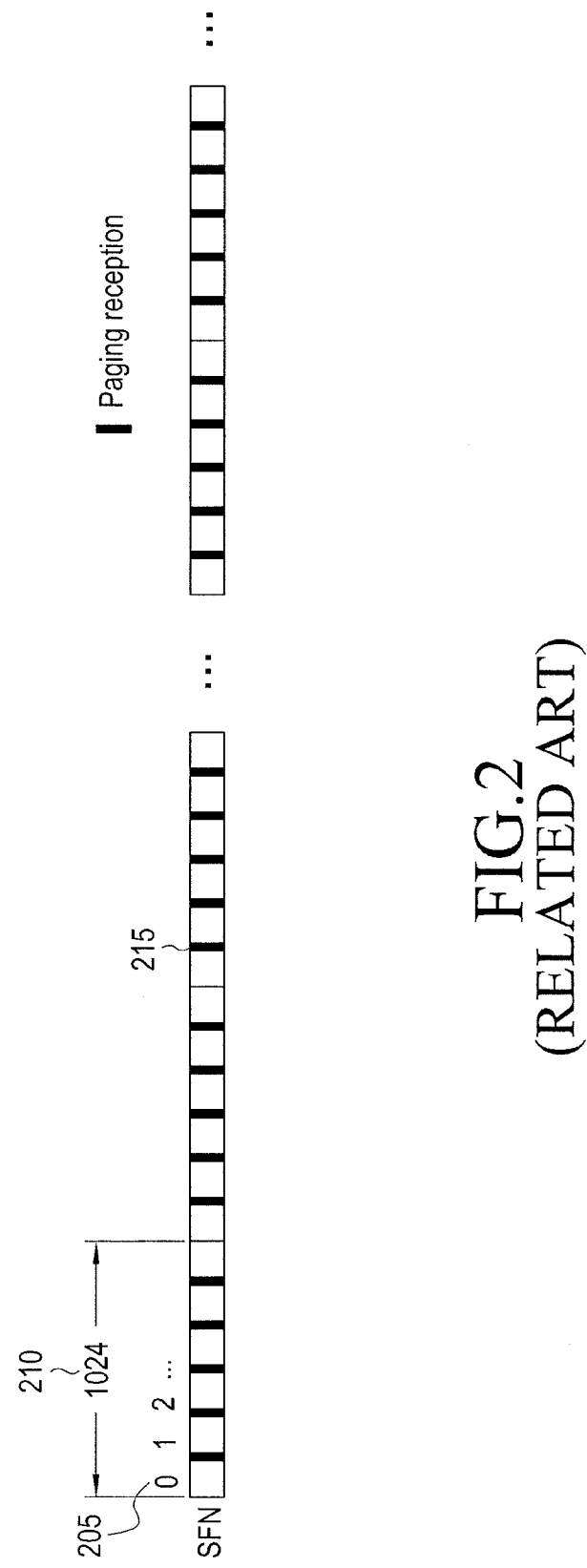
FIG. 2 is a view showing a conception of a paging occasion in a Long Term Evolution (LTE) technology according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for performing a Discontinuous Reception (DRX) operation based on a DRX cycle.

First Exemplary Embodiment

The first exemplary embodiment of the present invention provides a method for implementing a long System Frame Number (SFN) in order to extend a DRX cycle of a machine-type communication device, and a method for supporting a DRX operation compatible with existing DRX in a mobile communication system.

Hereinafter, according to the first exemplary embodiment of the present invention, a method for extending the length of an SFN of a machine-type communication device, and a DRX operation method for a machine-type communication device using a long DRX cycle will be described one after another.

In order to extend the length of an SFN to extend a DRX cycle of a machine-type communication device, an evolved Node B (eNB) must additionally transmit SFN bits to the machine-type communication device, and the transmission methods are as follows.

1) Transmitting additional SFN bits in a Master Information Block (MIB);
2) Transmitting additional SFN bits in an existing System Information Block (SIB);
3) Defining a new SIB for a machine-type communication device, and transmitting additional SFN bits in the new SIB.

In the first method of transmitting additional SFN bits in an MIB, the MIB includes necessary information, such as a downlink frequency band, a Physical Hybrid ARQ Indicator CHannel (PHICH) configuration information, and an SFN. In addition, the MIB contains 10 unused spare bits, which may be used to extend the length of an SFN. While general UEs use the existing SFN of 8 bits, machine-type communication devices can use not only the existing SFN of 8 bits but also extended SFN bits. Accordingly, while exerting no influence on the DRX operations of general UEs, machine-type communication devices can perform a DRX operation in a longer cycle.

In the second method of transmitting additional SFN bits in an existing SIB, the SIB has no resource limit in transmitting SFN bits, as compared with the MIB. By taking SFN bits of an MIB and SFN bits added to the SIB together into consideration, it is possible to express an SFN with a longer length. General UEs take only SFN bits of an MIB into consideration, and machine-type communication devices take the SFN bits of the MIB and the SFN bits added to the SIB together into consideration. The added SFN bits represent a value which is obtained by increasing by one every existing one SFN cycle (or every multiple of an SFN cycle, e.g., ½ SFN cycle, 3 SFN cycle, etc.). Through the value represented as above, it is possible to express an SFN length longer than the existing SFN length.

Also, according to the third method, SFN bits to be added may be included in a new SIB for a machine-type communication device. As described above, because the same additional SFN bit value is used within one SFN cycle, it is unnecessary to transmit an additional SFN bit value in all radio frames within one SFN cycle. Therefore, when additional SFN bits are transmitted in a SIB that is not frequently transmitted (e.g., preference of SIB2 to SIB 1), or when additional SFN bits are transmitted only in an SIB transmitted in a specific radio frame, it is possible to reduce an overhead due to the additional SFN bits. For example, when an SFN length is 1024, additional SFN bits may be transmitted only in an SIB transmitted in every radio frame corresponding to "SFN=0." Also, in consideration of the probability of reception failure, additional SFN bits may be transmitted in more radio frames. Also, in order to deliver information for a machine-type communication device, a new SIB may be made. In this case, additional SFN bits may be carried by the new SIB. Generally, because the new SIB is not frequently transmitted, the resulting overhead increase is small. According to the number of added SFN bits, the DRX cycle is extended as Table 1 below. As shown in Table 1 below, when 10 bits are added, the DRX cycle can be extended up to a maximum of about three hours.

TABLE 1

| Extended Bits | 2n | Cycle (Min) |
| --- | --- | --- |
| 1 | 2 | 0.3 |
| 2 | 4 | 0.7 |
| 3 | 8 | 1.4 |
| 4 | 16 | 2.7 |
| 5 | 32 | 5.5 |
| 6 | 64 | 10.9 |
| 7 | 128 | 21.8 |
| 8 | 256 | 43.7 |
| 9 | 512 | 87.4 |
| 10 | 1024 | 174.8 |

Hereinafter, the aforementioned DRX operation for a machine-type communication device using a long SFN will be described. The first exemplary embodiment of the present invention proposes a method for extending a DRX cycle, and for simultaneously receiving a paging signal several times during a predetermined DRX cycle in order to increase the probability of reception success of the paging signal. To this end, a paging occasion is determined through a procedure including two steps.

1) First step: determining additional SFN bits to transmit a paging signal for a machine-type communication device;
2) Second step: determining an SFN at which a paging signal is to be transmitted in the additional SFN bits determined in the first step.

In the first step, additional SFN bits to transmit a paging signal are determined. The additional SFN bits have a value increased by one every SFN cycle. A value expressed by the additional SFN bits is defined as a Super SFN (SSFN). Equation 2 below is used to find an SSFN at which a paging signal is to be transmitted.

$$SSFN \bmod T_M = (T_M \operatorname{div} N_M) * (UE\_ID \bmod N_M) \quad (2)$$

In Equation 2, $N_M$ is min ($T_M$, nBM), and $T_M$ and $nB_M$ are values provided from an eNB and may be included in an SIB2. UE_ID is an IMSI mod 1024 (or MTC device group ID mode 1024), and can be derived from the same IMSI module operation as the general UE. In addition, in the case of a machine-type communication device, because the communication device can be expressed in the form of a group ID, the UE_ID may be expressed by a group ID. After an SSFN at which a paging signal is to be transmitted is determined, as described above, it is determined which radio frames in the determined SSFN are used to transmit the paging signal. This can be implemented in such a way as described with reference to Equation 1.

As described above, when an occurrence occasion of a paging signal is defined by the two steps, and machine-type communication devices have a DRX cycle according to the defined occurrence occasion, it is possible to greatly reduce power consumption. Also, because a paging signal can be repeatedly transmitted according to "T" and "nB" set in an SSFN, which has been determined in the first step, it is possible to increase the reception probability of the paging signal.

Figure 3:
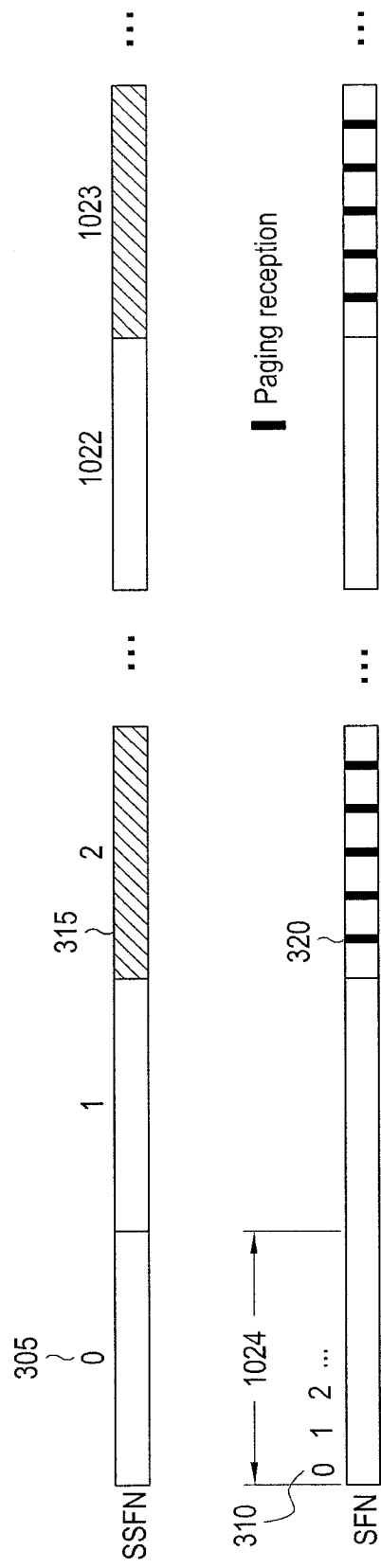
FIG. 3 is a view showing a conception of a paging occasion according to a first exemplary embodiment of the present invention.

FIG. 3 is a view showing a conception of a paging occasion according to the first exemplary embodiment of the present invention.

Referring to FIG. 3, an SSFN 305 increases by one every SFN cycle of 1024. Based on Equation 2, an SSFN 315 at which a paging signal is to be transmitted is determined. An SFN 310 increases by one every radio frame.

In the SSFN 315 determined based on Equation 2, an eNB transmits a paging signal 320 based on Equation 1.

Figure 4:
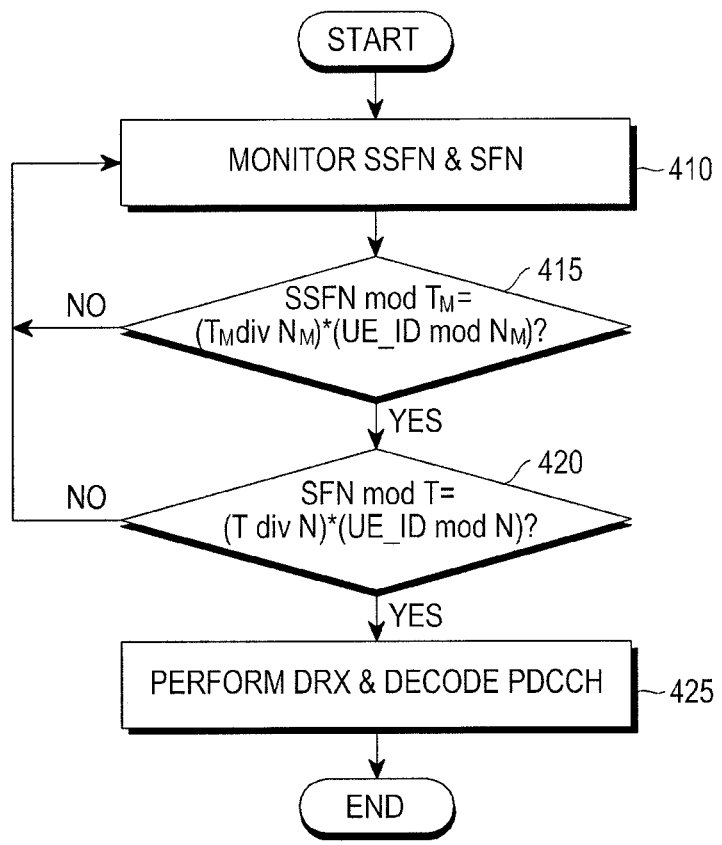
FIG. 4 is a flowchart illustrating the operation of a machine-type communication device according to the first exemplary embodiment of the present invention.

FIG. 4 is a flowchart illustrating the operation of a UE according to the first exemplary embodiment of the present invention. Here, the UE according to the first embodiment of the present invention is a machine-type communication device.

Referring to FIG. 4, in step 410, a UE monitors an SSFN and an SFN. For example, the UE monitors the SSFN and the SFN at the same time by additional SFN bits in an MIB, by additional SFN bits in an existing SIB, or by additional SFN bits in a new SIB, as described above. In this case, because the UE is aware of a time interval of one SFN and SSFN in step 410, it is unnecessary to perform a real-time monitoring, and it is enough to occasionally perform a monitoring so as to reduce the power consumption.

In step 415, the UE determines whether the monitored current SSFN satisfies Equation 2. When the current SSFN satisfies Equation 2, a paging signal can be transmitted in the current SSFN. Accordingly, the UE proceeds to step 420 in order to prepare the performance of a DRX. In contrast, when the current SSFN does not satisfy Equation 2 in step 415, the UE returns to step 410.

In step 420, the UE determines whether the monitored current SFN satisfies Equation 1. When the current SFN satisfies Equation 1, it means that a paging signal can be transmitted in the current SFN, so that the UE proceeds to step 425 in order to perform a DRX. In contrast, when the current SFN does not satisfy Equation 1 in step 420, the UE returns to step 410.

Then, in step 425, the UE decodes a PDCCH, and performs a DRX when a decoding-resultant PDCCH includes a paging signal.

Figure 5:
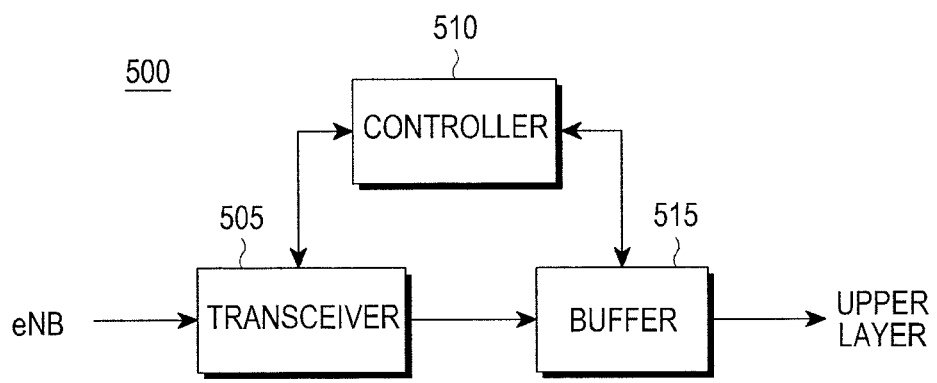
FIG. 5 is a block diagram illustrating the configuration of a User Equipment (UE) according to the first exemplary embodiment of the present invention.

FIG. 5 is a block diagram illustrating the configuration of a UE according to the first exemplary embodiment of the present invention.

Referring to FIG. 5, a UE 500 includes a transceiver 505, a controller 510, and a buffer 515.

The transceiver 505 receives an MIB, an SIB, or a new SIB from an eNB, and monitors an SSFN and an SFN. As an example, the monitoring is controlled by the controller 510. The SFN increases by one every radio frame of 10 ms, and the SSFN increases by one every SFN cycle having a length of 1024, which the UE 500 is aware of in advance. Therefore, the transceiver 505 in the UE 500 needs not decode a PBCH and a PDCCH every time in order to receive an MIB or SIB, and has only to occasionally monitor the PBCH and PDCCH.

The controller 510 determines whether the monitored current SFN and SSFN satisfy Equation 1 and Equation 2, respectively, and calculates a time point when a paging signal is transmitted. Then, when the time point when a paging signal is transmitted is reached, the controller 510 shifts the transceiver 505 into a reception mode, and attempts to decode a PDCCH. Then, when receiving a paging signal, the controller 510 stores the received paging signal in the buffer 515, and transfers information on the received paging signal to an upper layer.

Figure 6:
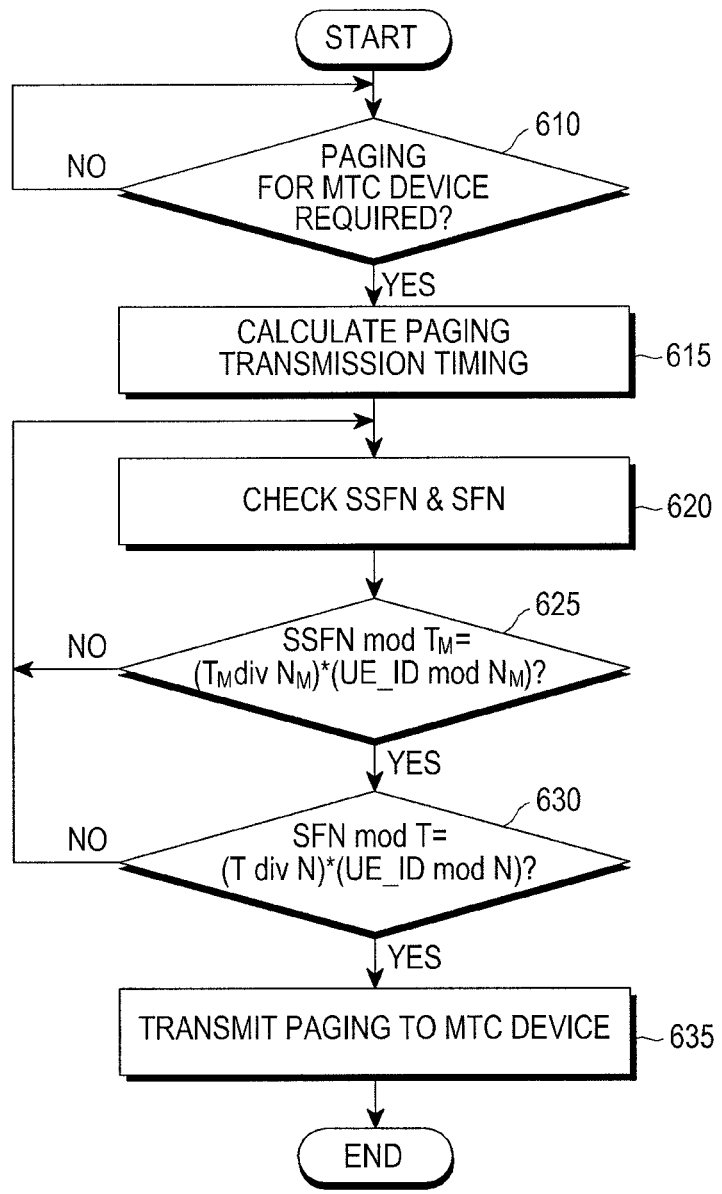
FIG. 6 is a flowchart illustrating the operation of an evolved Node B (eNB) according to the first exemplary embodiment of the present invention.

FIG. 6 is a flowchart illustrating the operation of an eNB according to the first exemplary embodiment of the present invention.

Referring to FIG. 6, the eNB determines whether a paging signal is required for the UE 500 in step 610. That is, when receiving data, which is to be transmitted to the UE 500, from an upper layer in step 610, the eNB determines that a paging signal is required, and proceeds to step 615. In contrast, when the eNB does not receive data to be transmitted to the UE 500 in step 610, the eNB is maintained in a waiting state until the eNB receives data to be transmitted to the UE 500.

In step 615, the eNB determines a timing (i.e., an SSFN and SFN), at which a paging signal is to be transmitted by taking an UE_ID (or MTC group ID) of the UE 500. Then, in step 620, the eNB checks the current SSFN and SFN. In step 625, the eNB determines whether the checked current SSFN satisfies Equation 2, and proceeds to step 630 when the current SSFN satisfies Equation 2. In contrast, when current SSFN does not satisfy Equation 2 in step 625, the eNB returns to step 620. In step 630, the eNB determines whether the checked current SFN satisfies Equation 1, and proceeds to step 635 in order to transmit a paging signal when the current SFN satisfies equation 1. In contrast, when current SFN does not satisfy Equation 1 in step 630, the eNB returns to step 620.

Then, in step 635, when a transmission timing according to the checked SSFN and SFN is reached, the eNB transmits a paging signal to the UE 500 by a PDCCH.

Figure 7:
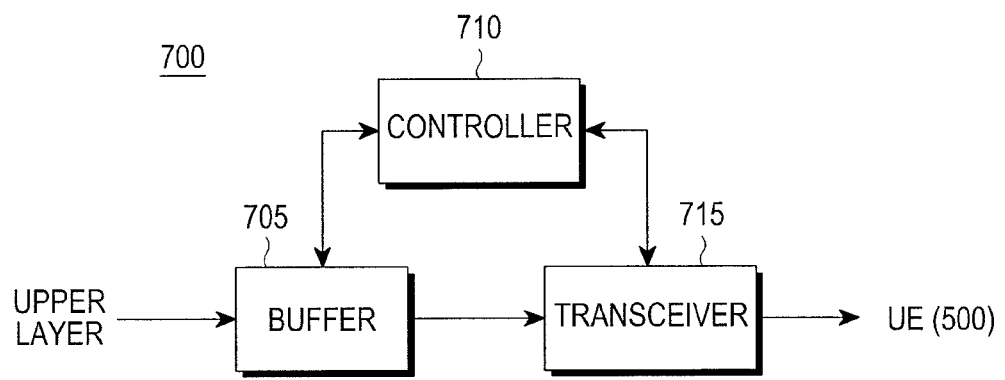
FIG. 7 is a block diagram illustrating the configuration of an eNB according to an exemplary embodiment of the present invention.

FIG. 7 is a block diagram illustrating the configuration of an eNB according to an exemplary embodiment of the present invention.

Referring to FIG. 7, the eNB 700 includes a buffer 705, a controller 710, and a transceiver 715.

The controller 710 determines whether data to be transmitted to the UE 500 has been received through the buffer 705 from an upper layer. Then, the controller 710 calculates a timing (i.e., an SSFN and SFN), at which a paging signal is to be transmitted by taking an UE_ID (or MTC group ID) of the UE 500. When the calculated SSFN and SFN (i.e., a timing at which the paging signal is to be transmitted), is reached based on Equations 1 and 2, the controller 710 transmits a Physical Downlink Control CHannel (PDCCH) including the paging signal through the transceiver 715 to the UE 500.

Second Exemplary Embodiment

Hereinafter, a DRX operation method using a long DRX cycle according to the second exemplary embodiment of the present invention.

In the related art, a Mobility Management Entity (MME) compares a UE-specific DRX cycle and a cell-specific DRX cycle, and determines and uses a smaller value of the two DRX cycles as a paging cycle of a corresponding UE. Thus, in the related art, although a UE wants to receive a paging in a cycle longer than a cell-specific DRX cycle and transmits a UE-specific DRX cycle of a long cycle to the MME, the UE cannot be provided with the long UE-specific DRX cycle as a paging cycle of the UE.

For example, an MTC requiring reduction of power consumption, as described in the first exemplary embodiment of the present invention, needs a DRX cycle longer than a cell-specific DRX cycle, which has been set for supporting general UEs. As another example, there is a UE which supports dual radio. For a UE which supports both 3GPP LTE and 3GPP 1X system, it is necessary to set a DRX cycle in accordance with a system having a long DRX cycle in order to reduce power consumption.

Therefore, the second exemplary embodiment of the present invention provides a method for making it possible to apply a UE to apply a UE-specific DRX cycle, which is a relatively longer cycle, in a UE.

Figure 8:
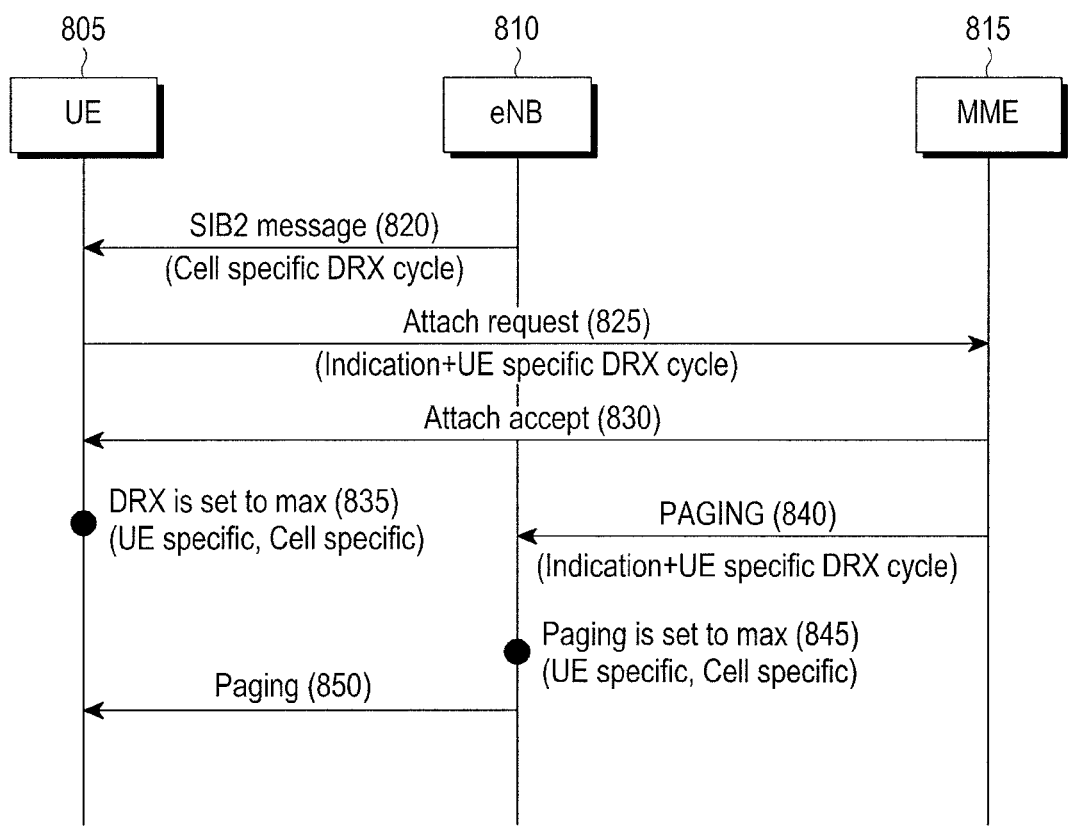
FIG. 8 is a flow diagram illustrating a procedure for applying a UE-specific Discontinuous Reception (DRX) cycle according to a second exemplary embodiment of the present invention.

FIG. 8 is a flow diagram illustrating a procedure for applying a UE-specific DRX cycle according to the second exemplary embodiment of the present invention.

Referring to FIG. 8, in step 820, a UE 805 receives an SIB2 message from an eNB 810, and is provided with a cell-specific DRX cycle included in the SIB2. In this case, the UE 805 may receive a paging through the use of the cell-specific DRX cycle received from the eNB 810, or may receive a paging after providing a UE-specific DRX cycle to a Mobility Management Entity (MME) 815.

In step 825, the UE 805 transfers an indication, representing that the UE 805 does not follow the existing DRX cycle determination scheme, and a UE-specific DRX cycle which is a long cycle desired by the UE 805 to the MME 815, through an attach request message. Then, in step 830, the MME 815 notifies the UE 805 that the attach request message has been successfully received, through an attach accept message. Thereafter, in step 835, the UE 805 compares the cell-specific DRX cycle with the UE-specific DRX cycle, and determines a longer cycle value of the two DRX cycles to be applied. As an example, the UE 805 may determine the UE-specific DRX cycle to be applied, without performing the comparing process of step 835.

In step 840, the MME 815 provides the eNB 810 with the indication and UE-specific DRX cycle, which have been received from the UE 805, so that the eNB 810 can calculate a DRX cycle of the UE 805. In step 845, the eNB 810 determines a paging cycle of the UE 805 in a manner different from the existing determination scheme, due to the indication provided from the MME 815. That is, in step 845, the eNB 810 compares the cell-specific DRX cycle with the UE-specific DRX cycle, and determines a longer cycle value of the two cycles to be applied. As an example, without performing the comparing process of step 845, the MME 815 may apply the UE-specific DRX cycle.

Then, in step 850, the eNB 810 transmits a paging to the UE 805 in the determined DRX cycle.

While the second exemplary embodiment of the present invention shows an example in which the UE 805 directly provides the MME 815 with a desired DRX cycle, exemplary embodiments of the present invention may be implemented in such a manner that the UE 805 notifies the MME 815 that the UE 805 uses a DRX cycle having a specific cycle pattern. Also, the UE 805 may inform that the UE 805 does not follow the existing DRX cycle determination scheme, through an indication. In this case, the UE 805 may define cycles having various patterns in advance, and use indication values indicating the cycles having various patterns.

Third Exemplary Embodiment

Hereinafter, according to the third exemplary embodiment of the present invention, a method for supporting a long DRX cycle provided in a wireless network environment where homogeneous or heterogeneous eNBs, of which the supportable DRX cycles are different, exist together, will be described.

In a wireless network environment for the next-generation mobile communication, heterogeneous wireless networks can be constructed in the same area. Such heterogeneous wireless networks existing in the same area have a function of performing an intersystem overhead in order to maximize the performances thereof, and can provide a UE with a high-quality service in cooperation with each other. Also, even in wireless networks of the same system, eNBs of various versions may be installed for performance improvement, wherein as the version is upgraded, new functions may be added. A UE may receive a service in a wireless network environment where homogeneous or heterogeneous eNBs, the maximums of offerable DRX cycles of which are different, exist together.

Therefore, although a UE requests a network to apply a long DRX cycle, a paging message may not be provided in the long DRX cycle requested by the UE depending on whether or not homogeneous or heterogeneous eNBs can support the corresponding DRX cycle. Therefore, an UE needs to be aware of whether an eNB of a cell, on which the UE is currently camping, can support a DRX cycle requested by the UE, and accordingly, the operation of the UE varies. According to the third exemplary embodiment of the present invention, a UE's operation for supporting a long DRX cycle in the aforementioned wireless network environment is defined. Here, a state in which the UE is camping on a cell represents a state in which the UE can receive control information from the cell.

A method for supporting a long DRX cycle according to the third exemplary embodiment of the present invention is as follows.

A UE requests an eNB to apply a UE-specific DRX cycle through a registration process (which is called an attach process in 3GPP). When the requested UE-specific DRX cycle is equal to or longer than a predetermined reference cycle, the UE determines whether a long DRX cycle is supported in a corresponding cell whenever moving from a cell to another cell in an idle state. In a cell where a long DRX cycle is supported, a UE calculates a paging occasion through the use of a larger value of two DRX cycles (i.e., a long DRX cycle requested by the UE, and a cell-specific DRX cycle broadcasted in the cell).

In contrast, in a cell where a long DRX cycle is not supported, a UE calculates a paging occasion through the use of a smaller value of two DRX cycles, (i.e., a UE-specific DRX cycle, which is a long DRX cycle requested by the UE, and a cell-specific DRX cycle broadcasted in the cell). Consequently, in a cell where a long DRX cycle is not supported, a cell-specific DRX cycle is used at all times.

Also, according to the third exemplary embodiment of the present invention, in the case in which a UE requests a long DRX cycle equal to or greater than a predetermined reference value in a registration process and so on, when transmitting a paging message for the UE, an MME inserts and transmits a value requested by the UE as the UE-specific DRX cycle of the paging message with respect to cells supporting a long DRX cycle among cells to which the paging message must be transmitted. In contrast, with respect to cells in which a long DRX cycle is not supported, the MME inserts and transmits a predetermined value as the UE-specific DRX cycle of the paging message. The predetermined value is used to allow a resultant value to be a cell-specific DRX cycle at all times when in a cell where a long DRX cycle is not supported uses a smaller value of two DRX cycles (i.e., a UE-specific DRX cycle provided by a MME, and a cell-specific DRX cycle managed by the cell according to the related technology). Therefore, the predetermined value may be the largest value (i.e., 2.56 seconds), of DRX cycles, other than the long DRX cycle.

When an eNB supporting a long DRX cycle receives a paging message from an MME, the eNB determines whether the UE-specific DRX cycle of the paging message is a long DRX cycle, and calculates a paging occasion, during which the paging message is to be transmitted to the UE, by applying the UE-specific DRX cycle when the UE-specific DRX cycle of the paging message is a long DRX cycle. In contrast, when the UE-specific DRX cycle of the paging message is not a long DRX cycle, the eNB calculates a paging occasion, during which the paging message is to be transmitted to the UE, through the use of a smaller value of two DRX cycles (i.e., a cell-specific DRX cycle, and the UE-specific DRX cycle).

Hereinafter, the third exemplary embodiment of the present invention will be described in detail with reference to FIG. 9.

Figure 9:
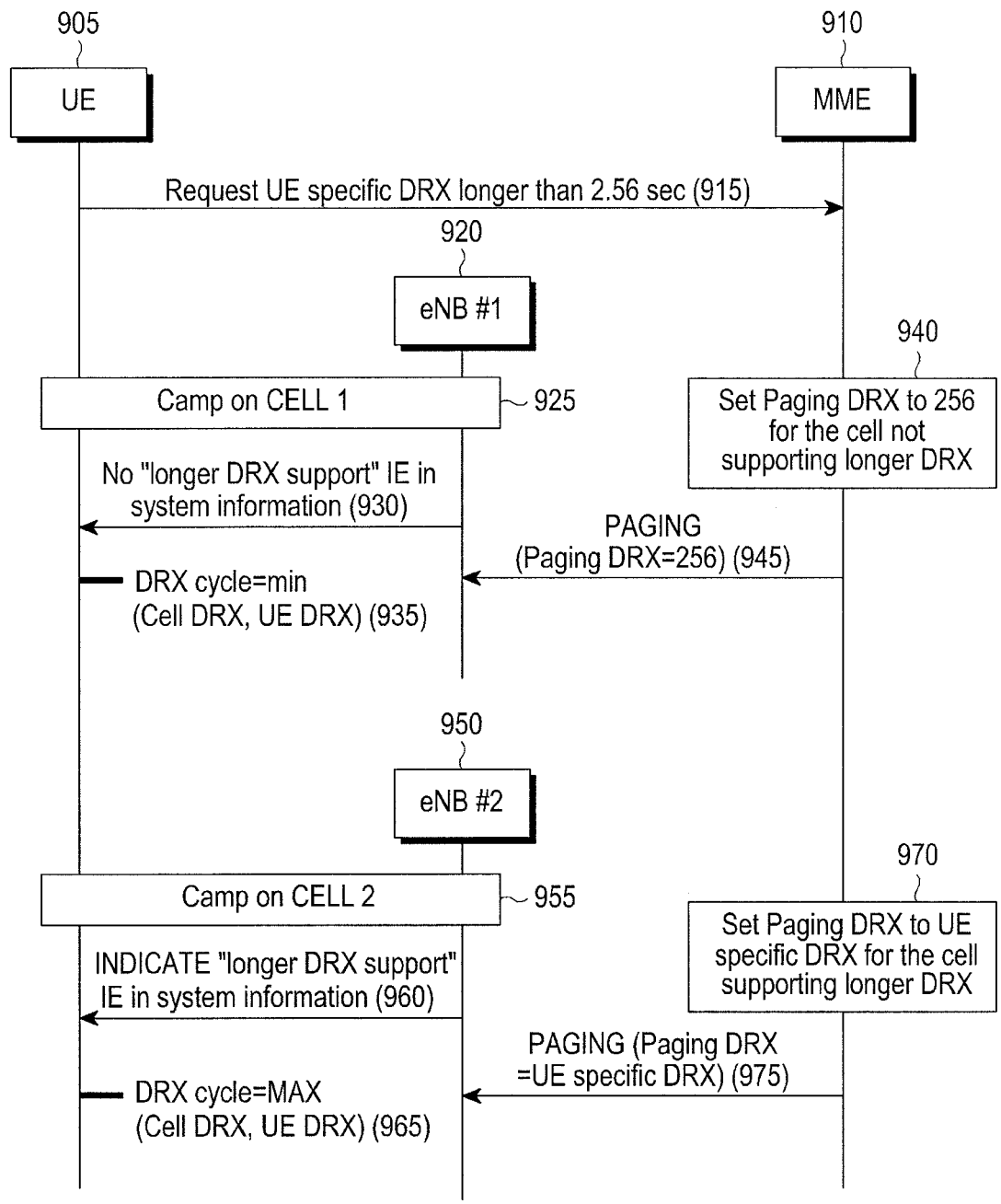
FIG. 9 is a flow diagram illustrating the operations of a UE and an Mobility Management Entity (MME) according to a third exemplary embodiment of the present invention.

FIG. 9 is a flow diagram illustrating the operations of a UE and an MME according to the third exemplary embodiment of the present invention.

Referring to FIG. 9, when powered on, an UE 905 performs an attach process to an MME 910 in step 915. In step 915, the UE 905 provides a desired DRX cycle to the MME 910. When an eNB 920 of cell #1 on which the UE 905 is camping in step 925 is an eNB which cannot provide a long DRX cycle, the eNB 920, broadcasts system information that the eNB 920 cannot support the long DRX cycle to the UE 905 in step 930. When the UE 905 recognizes that the eNB 920 of cell #1, on which the UE 905 is currently camping, cannot provide the long DRX cycle requested by the UE 905, the UE 905 determines a DRX cycle by Equation 3 below in step 935.

$$DRX\ cycle=\min(cell\ specific\ DRX, UE\ specific\ DRX) \quad (3)$$

When the UE 905 is camping on the eNB 920, which cannot support the long DRX cycle requested by the UE 905, the MME 910 sets a paging DRX cycle to 2.56 seconds, which is the maximum cycle, in step 940, and transmits a paging to the eNB 920 in step 945 when the paging occurs.

In contrast, when an eNB 950 of cell #2 on which the UE 905 is camping in step 955 is an eNB which can provide a long DRX cycle, the eNB 950 broadcasts system information that the eNB 950 can support the long DRX cycle to the UE 905 in step 960. When the UE 905 recognizes that the eNB 950 of cell #2, on which the UE 905 is currently camping, can provide the long DRX cycle requested by the UE 905, the UE 905 determines a DRX cycle by Equation 4 below in step 965.

$$DRX\ cycle=\max(cell\ specific\ DRX, UE\ specific\ DRX) \quad (4)$$

When the UE 905 is camping on the eNB 950, which can support the long DRX cycle requested by the UE 905, the MME 910 sets a paging DRX cycle to the long DRX cycle requested by the UE 905 in step 970, and transmits a paging to the eNB 950 in step 975 when the paging occurs.

Figure 10:
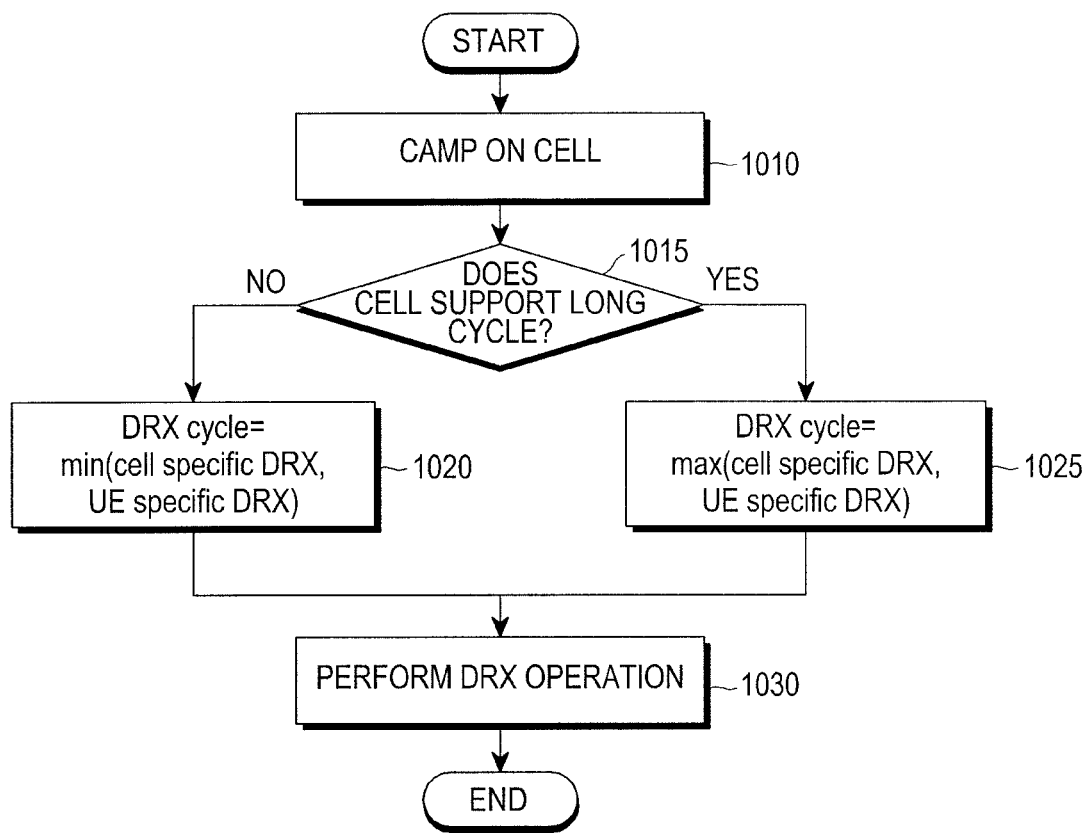
FIG. 10 is a flowchart illustrating the operation of the UE according to the third exemplary embodiment of the present invention.

FIG. 10 is a flowchart illustrating the operation of a UE according to the third exemplary embodiment of the present invention.

Before performing the operation described in FIG. 10, the UE 905 performs a registration process with the MME 910, wherein an eNB is notified of a UE-specific DRX cycle in the registration process. The operation of the UE 905, presented in FIG. 10, corresponds to the operation of the UE 905 which makes a request for the UE-specific DRX cycle (i.e., a long DRX cycle), having a value larger than the maximum value defined in LTE Rel-8/-9. After performing the registration process, the UE 905 transitions to an idle state and performs an idle mode operation in general.

FIG. 10 illustrates an operation of the UE 905 for receiving a paging message in an idle state.

Referring to FIG. 10, when the UE 905 is camping on a cell in step 1010, the UE 905 proceeds to step 1015 at which the UE 905 determines whether or not the eNB of the cell supports a long DRX cycle. Determination as to whether the eNB of the cell supports a long DRX cycle can be made in a manner as described in the second exemplary embodiment of the present invention. That is, it may be determined that the cell supports a long DRX cycle when system information broadcasted in the cell includes a "long DRX Support indication," and it may be determined that the cell does not support a long DRX cycle when system information broadcasted in the cell does not include a "long DRX Support indication." Otherwise, whether or not a long DRX cycle is supported may be set depending on each Tracking Area (TA). Here, the TA represents a unit area for identifying the mobility of a UE being in an idle state, and is constituted by a plurality of cells. When a UE being in an idle state is camping on a cell included in a TA different from a previous TA, the UE performs a location update procedure. For example, when the UE 905 performs a location update procedure, the MME 910 indicates whether or not a long DRX cycle is supported in a corresponding TA, and the UE 905 determines that a cell supports a long DRX cycle when the cell belongs to a TA supporting a long DRX cycle, and determines that a cell does not support a long DRX cycle when the cell belongs to a TA not supporting a long DRX cycle.

The UE 905 proceeds to step 1020 when a corresponding cell corresponds to a cell not supporting a long DRX cycle, and proceeds to step 1025 when the corresponding cell corresponds to a cell supporting a long DRX cycle. In step 1020, the UE 905 selects a smaller value of a cell-specific DRX cycle and a UE-specific DRX cycle as a DRX cycle, and calculates a paging occasion by applying the selected DRX cycle. When the UE 905 uses a long DRX cycle, the UE-specific DRX cycle always is longer than the cell-specific DRX cycle, so that the DRX cycle selected by the UE 905 in step 1020 is the cell-specific DRX cycle at all times. Therefore, step 1020 may be changed to a step in which the UE 905 selects the cell-specific DRX cycle without taking the UE-specific DRX cycle into consideration.

In step 1025, the UE 905 selects a larger value of a cell-specific DRX cycle and a UE-specific DRX cycle as a DRX cycle, and calculates a paging occasion by applying the selected DRX cycle. When the UE 905 uses a long DRX cycle, the UE-specific DRX cycle always is longer than the cell-specific DRX cycle, so that the DRX cycle selected by the UE 905 in step 1025 is the UE-specific DRX cycle. Therefore, step 1025 may be changed to a step in which the UE 905 selects the UE-specific DRX cycle without taking the cell-specific DRX cycle into consideration.

In step 1030, the UE 905 performs a DRX operation of determining whether a paging message is received every paging occasion, which has been calculated in step 1020 or 1025.

Figure 11:
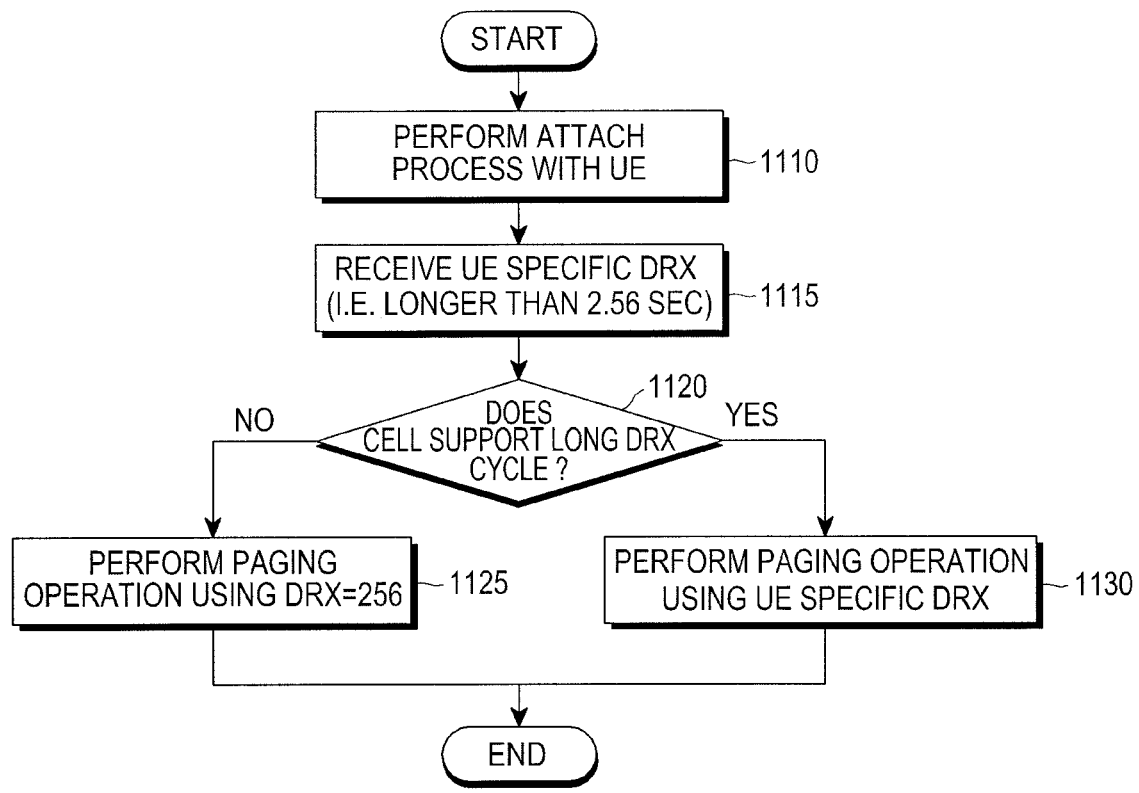
FIG. 11 is a flowchart illustrating the operation of the MME according to the third exemplary embodiment of the present invention.

FIG. 11 is a flowchart illustrating the operation of the MME according to the third exemplary embodiment of the present invention.

Referring to FIG. 11, while the MME 910 performs an attach process with the UE 905 in step 1110, the MME 910 receives a request for a long DRX cycle from the UE 905 in step 1115.

Then, the MME 910 stores the DRX cycle and so on requested by the UE 905, and when a paging message for the UE 905 is generated, the MME 910 proceeds to step 1120 for determining a UE-specific DRX cycle which is inserted into a paging message to be transmitted to eNBs belonging to a TA, where the UE 905 is located. For example, in step 1120, it may be determined whether the cell supports a long DRX cycle.

Next, the MME 910 proceeds to step 1125 when an eNB of a cell belonging to a TA in which the UE 905 is located does not support a long DRX cycle, and proceeds to step 1130 when the corresponding eNB supports a long DRX cycle.

In step 1125, the MME 910 inserts a predetermined value (e.g., 2.56 seconds), other than the UE-specific DRX cycle of the UE 905, into a UE-specific DRX cycle section of the paging message to be transmitted to the eNB, and then transmits the paging message.

In step 1130, the MME 910 inserts the UE-specific DRX cycle requested by the UE 905 into the UE-specific DRX cycle section of the paging message to be transmitted to the eNB, and then transmits the paging message.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for supporting a Discontinuous Reception (DRX) operation in a Node B in a mobile communication system, the method comprising:
    defining a second System Frame Number (SFN) where one cycle of a first SFN corresponds to one bit;
    transmitting information on the second SFN to a User Equipment (UE);
    determining a second SFN which is used to transmit a paging signal to the UE;
    determining a first SFN which is used to transmit the paging signal in the determined second SFN; and
    transmitting the paging signal to the UE at the determined first SFN.

2. The method of claim 1, wherein the determined second SFN satisfies "$(T_M \text{ div } N_m)*(UE\_ID \text{ mod } N_M)$" and the determined first SFN satisfies "$(T \text{ div } N)*(UE\_ID \text{ mod } N)$", and
    wherein the $N_M$ is min $(T_M, nB_M)$, the "N" is min $(T, nB)$, the $T_M$, $nB_M$, T, and nB are DRX cycles of the UE, and UE_ID is an International Mobile Station Identity (IMSI).

3. The method of claim 1, wherein the second SFN is added to one of a Master Information Block (MIB), an existing System Information Block (SIB), and a new SIB, and is then transmitted to the UE.

4. The method of claim 1, wherein the UE corresponds to a machine-type communication device.

5. An apparatus for supporting a Discontinuous Reception (DRX) operation in a Node B in a mobile communication system, the apparatus comprising:
    a transceiver for defining a second System Frame Number (SFN) where one cycle of a first SFN corresponds to one bit, and for transmitting information on the second SFN to a User Equipment (UE); and
    a controller for determining a second SFN which is used to transmit a paging signal to the UE, for determining a first SFN which is used to transmit the paging signal in the determined second SFN, and for controlling the transceiver to transmit the paging signal to the UE at the determined first SFN.

6. The apparatus of claim 5, wherein the determined second SFN satisfies "$(T_M \text{ div } N_m)*(UE\_ID \text{ mod } N_M)$" and the determined first SFN satisfies "$(T \text{ div } N)*(UE\_ID \text{ mod } N)$", and
    wherein the $N_M$ is min $(T_M, nB_M)$, the "N" is min $(T, nB)$, the $T_M$, $nB_M$, T, and nB are DRX cycles of the UE, and UE_ID is an International Mobile Station Identity (IMSI).

7. The apparatus of claim 5, wherein the second SFN is added to one of a Master Information Block (MIB), an existing System Information Block (SIB), and a new SIB, and is then transmitted to the UE.

8. The apparatus of claim 5, wherein the UE corresponds to a machine-type communication device.

9. A method for supporting a Discontinuous Reception (DRX) operation in a User Equipment (UE) in a mobile communication system, the method comprising:
    receiving, from a Node B, information on a second System Frame Number (SFN), where one cycle of a first SFN corresponds to one bit;
    monitoring the first SFN and the second SFN every cycle of the first SFN;
    determining whether the second SFN includes a paging signal;
    determining whether the first SFN corresponding to the second SFN includes the paging signal when the second SFN includes the paging signal; and
    identifying the paging signal through the first SFN when the first SFN includes the paging signal.

10. The method of claim 9, wherein a case in which the second SFN includes the paging signal corresponds to a case in which the second SFN satisfies "$(T_M \text{ div } NM)*(UE\_ID \text{ mod } N_M)$" and a case in which the first SFN includes the paging signal corresponds to a case in which the first SFN satisfies "$(T \text{ div } N)*(UE\_ID \text{ mod } N)$",
    wherein the $N_M$ is min $(T_M, nB_M)$, the "N" is min $(T, nB)$, the $T_M$, $nB_M$, T, and nB are DRX cycles of the UE, and UE_ID is an International Mobile Station Identity (IMSI).

11. The method of claim 9, wherein the second SFN is added to one of a Master Information Block (MIB), an existing System Information Block (SIB), and a new SIB, and is then transmitted to the UE.

12. The method of claim 9, wherein the UE corresponds to a machine-type communication device.

13. An apparatus for supporting a Discontinuous Reception (DRX) operation in a User Equipment (UE) in a mobile communication system, the apparatus comprising:
    a transceiver for receiving, from a Node B, information on a second System Frame Number (SFN), where one cycle of a first SFN corresponds to one bit; and
    a controller for monitoring the first SFN and the second SFN every cycle of the first SFN, for determining whether the second SFN includes a paging signal, for determining whether the first SFN corresponding to the second SFN includes the paging signal when the second SFN includes the paging signal, and for identifying the paging signal through the first SFN when the first SFN includes the paging signal.

14. The apparatus of claim 13, wherein the second SFN is added to one of a Master Information Block (MIB), an existing System Information Block (SIB), and a new SIB, and is then transmitted to the UE.

15. The apparatus of claim 13, wherein a case in which the second SFN includes the paging signal corresponds to a case in which the second SFN satisfies "$(T_M$ div $NM)*(UE\_ID$ mod $N_M)$" and a case in which the first SFN includes the paging signal corresponds to a case in which the first SFN satisfies "$(T$ div $N)*(UE\_ID$ mod $N)$",
wherein the $N_M$ is min $(T_M, nB_M)$, the "N" is min $(T, nB)$, the $T_M$, $nB_M$, T, and nB are DRX cycles of the UE, and UE_ID is an International Mobile Station Identity (IMSI).

16. The apparatus of claim 13, wherein the UE corresponds to a machine-type communication device.

17. A method for supporting a Discontinuous Reception (DRX) operation in a User Equipment (UE) in a mobile communication system, the method comprising:
receiving system information which includes a cell-specific DRX cycle from a Node B;
transmitting an attach request message, which includes a UE-specific DRX cycle and an indication for selecting a DRX cycle of a long cycle, to a Mobility Management Entity (MME);
selecting a longer cycle of the cell-specific DRX cycle and the UE-specific DRX cycle when receiving an attach response message from the MME; and
receiving a paging message from the Node B in the selected DRX cycle.

18. An apparatus for supporting a Discontinuous Reception (DRX) operation in a User Equipment (UE) in a mobile communication system, the apparatus comprising:
a transceiver for receiving system information which includes a cell-specific DRX cycle from a Node B, and for transmitting an attach request message to a Mobility Management Entity (MME), the attach request message including a UE-specific DRX cycle and an indication for selecting a DRX cycle of a long cycle; and
a controller for selecting a longer cycle of the cell-specific DRX cycle and the UE-specific DRX cycle when receiving an attach response message from the MME; and for controlling the transceiver to receive a paging message from the Node B in the selected DRX cycle.

19. A method for supporting a Discontinuous Reception (DRX) operation in a Node B in a mobile communication system, the method comprising:
transmitting system information which includes a cell-specific DRX cycle to a User Equipment (UE);
receiving a UE-specific DRX cycle and an indication for selecting a DRX cycle of a long cycle from a Mobility Management Entity (MME);
selecting a longer cycle of the cell-specific DRX cycle and the UE-specific DRX cycle; and
transmitting a paging message to the UE in the selected DRX cycle.

20. An apparatus for supporting a Discontinuous Reception (DRX) operation in a Node B in a mobile communication system, the apparatus comprising:
a transceiver for transmitting system information which includes a cell-specific DRX cycle to a User Equipment (UE), and for receiving a UE-specific DRX cycle and an indication for selecting a DRX cycle of a long cycle from a Mobility Management Entity (MME); and
a controller for selecting a longer cycle of the cell-specific DRX cycle and the UE-specific DRX cycle, and for controlling the transceiver to transmit a paging message to the UE in the selected DRX cycle.

21. A method for supporting a Discontinuous Reception (DRX) operation in a User Equipment (UE) in a mobile communication system, the method comprising:
determining whether a cell on which the UE is currently camping corresponds to a cell supporting a DRX cycle of a long cycle;
selecting a longer DRX cycle of a cell-specific DRX cycle and a UE-specific DRX cycle when the cell on which the UE is currently camping supports the DRX cycle of a long cycle; and
receiving a paging message from a Node B of the cell, on which the UE is camping, in the selected DRX cycle.

22. The method as claimed in claim 21, further comprising: selecting a shorter DRX cycle of a cell-specific DRX cycle and a UE-specific DRX cycle when the cell on which the UE is currently camping does not support the DRX cycle of a long cycle.

23. An apparatus for supporting a Discontinuous Reception (DRX) operation in a User Equipment (UE) in a mobile communication system, the apparatus comprising:
a controller for determining whether a cell on which the UE is currently camping corresponds to a cell supporting a DRX cycle of a long cycle, and for selecting a longer DRX cycle of a cell-specific DRX cycle and a UE-specific DRX cycle when the cell on which the UE is currently camping supports the DRX cycle of a long cycle; and
a transceiver for receiving a paging message from a Node B of the cell, on which the UE is camping, in the selected DRX cycle.

24. The apparatus as claimed in claim 23, wherein, when the cell on which the UE is currently camping does not support the DRX cycle of a long cycle, the controller selects a shorter DRX cycle of a cell-specific DRX cycle and a UE-specific DRX cycle.

25. A method for supporting a Discontinuous Reception (DRX) operation in a Mobility Management Entity (MME) in a mobile communication system, the method comprising:
receiving a request for a DRX cycle of a long cycle from a User Equipment (UE);
determining whether a cell on which the UE is camping supports a DRX cycle of a long cycle; and
transmitting a paging message to a Node B of the cell, on which the UE is camping, in a UE-specific DRX cycle when the cell on which the UE is camping supports a DRX cycle of a long cycle.

26. The method as claimed in claim 25, further comprising: transmitting the paging message to the Node B of the cell, on which the UE is camping, in a predetermined cycle when the cell on which the UE is camping does not support a DRX cycle of a long cycle.

27. An apparatus for supporting a Discontinuous Reception (DRX) operation in a Mobility Management Entity (MME) in a mobile communication system, the apparatus comprising:
a transceiver for receiving a request for a DRX cycle of a long cycle from a User Equipment (UE); and
a controller for determining whether a cell on which the UE is camping supports a DRX cycle of a long cycle, and for controlling the transceiver to transmit a paging message to a Node B of the cell, on which the UE is camping, in a UE-specific DRX cycle when the cell on which the UE is camping supports a DRX cycle of a long cycle.

28. The apparatus as claimed in claim 27, wherein, when the cell on which the UE is camping does not support a DRX cycle of a long cycle, the controller controls the transceiver to transmit the paging message the Node B of the cell, on which the UE is camping, in a predetermined cycle.

\* \* \* \* \*